US009992105B2

(12) United States Patent
Ratnasingham (10) Patent No.: US 9,992,105 B2
(45) Date of Patent: Jun. 5, 2018

(54) LABEL SWITCHED PATH REPORTING

(71) Applicant: Juniper Networks, Inc., Sunnyvale, CA (US)

(72) Inventor: Kumuthini Ratnasingham, Saratoga, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 77 days.

(21) Appl. No.: 15/085,897

(22) Filed: Mar. 30, 2016

(65) Prior Publication Data
US 2017/0289028 A1    Oct. 5, 2017

(51) Int. Cl.
| H04L 12/723 | (2013.01) |
| H04L 12/913 | (2013.01) |
| H04L 12/24 | (2006.01) |
| H04L 12/751 | (2013.01) |

(52) U.S. Cl.
CPC .............. *H04L 45/50* (2013.01); *H04L 41/12* (2013.01); *H04L 45/02* (2013.01); *H04L 47/724* (2013.01)

(58) Field of Classification Search
CPC ....... H04L 12/24; H04L 12/28; H04L 12/723; H04L 12/751; H04L 41/12; H04L 45/02; H04L 45/10; H04L 45/16; H04L 45/38; H04L 45/50; H04L 45/507; H04L 47/72; H04L 47/724
See application file for complete search history.

(56) References Cited

U.S. PATENT DOCUMENTS 7,995,593 B2 *  8/2011  Vasseur ................... H04L 45/04
                                                                  370/216
8,339,959 B1    12/2012  Moisand et al.
(Continued)

FOREIGN PATENT DOCUMENTS

WO      2013184846 A1    12/2013

OTHER PUBLICATIONS

Braden, et al., "Resource ReSerVation Protocol (RSVP)—Version 1 Functional Specification," RFC 2205, Network Working Group, Sep. 1997, 112 pp.
(Continued)

*Primary Examiner* — Tri H Phan
(74) *Attorney, Agent, or Firm* — Shumaker & Sieffert, P.A.

(57) ABSTRACT

Techniques are described for reporting, by non-ingress routers for traffic engineering label switched paths (TE LSPs) and to a path computation element, actual paths taken by the TE LSPs through the network. A first network device: receives, from a second network device, an LSP path signaling message that includes a route object having a first indication of at least a sub-path of a path for TE LSP through a network, wherein the first network device is not an ingress label edge router for the TE LSP; generates, in response to the LSP path signaling message and based at least in part on the route object, an LSP path report message that includes a second indication of the at least the sub-path of the path for the TE LSP; and sends, to a path computation element, the LSP path report message to notify the PCE.

23 Claims, 5 Drawing Sheets

(56) References Cited

U.S. PATENT DOCUMENTS

| | | | | |
|---|---|---|---|---|
| 8,462,635 | B1* | 6/2013 | Aggarwal | H04L 41/12 370/236 |
| 8,750,288 | B2* | 6/2014 | Nakil | G06N 99/005 370/351 |
| 8,787,154 | B1* | 7/2014 | Medved | H04L 45/64 370/225 |
| 8,824,274 | B1* | 9/2014 | Medved | H04L 41/12 370/217 |
| 8,885,463 | B1 | 11/2014 | Medved et al. | |
| 9,450,817 | B1* | 9/2016 | Bahadur | H04L 45/64 |
| 9,450,864 | B2* | 9/2016 | Zhao | H04L 45/42 |
| 9,577,925 | B1* | 2/2017 | Bahadur | H04L 45/50 |
| 9,705,781 | B1* | 7/2017 | Medved | H04L 45/02 |
| 9,716,648 | B2* | 7/2017 | Chen | H04L 45/12 |
| 2015/0103844 | A1 | 4/2015 | Zhao et al. | |
| 2016/0359735 | A1* | 12/2016 | Zhao | H04L 45/42 |
| 2017/0012895 | A1* | 1/2017 | Zhao | H04L 47/724 |
| 2017/0111282 | A1* | 4/2017 | Chen | H04L 12/4633 |
| 2018/0019944 | A1* | 1/2018 | Peng | H04L 45/507 |

OTHER PUBLICATIONS

Awduche et al., "RSVP-TE: Extensions to RSVP for LSP Tunnels," RFC 3209, Network Working Group, Dec. 2001, 61 pp.

Vasseur et al., "Path Computation Element (PCE) Communication Protocol (PCEP)," RFC 5440, Network Working Group, Mar. 2009, 87 pp.

Crabbe et al., "PCEP Extensions for Stateful PCE," PCE Working Group Internet Draft, draft-ieff-pce-stateful-pce-11, Apr. 20, 2015, 47 pp.

U.S. Appl. No. 14/042,614, by Nitin Bahadur, filed Sep. 30, 2013.

U.S. Appl. No. 14/500,736 by David C. Wood, filed Sep. 29, 2014.

Extended European Search Report from counterpart European Application No. 17163965.1, dated Jun. 7, 2017, 11 pp.

Zhang, et al., "Applicability of Stateful Path Computation Element (PCE)," Network Working Group, Oct. 18, 2012, 24 pp.

Response to EPO filed in counterpart European Application No. 17163965.1, dated Apr. 4, 2018, 6 pp.

* cited by examiner

LABEL SWITCHED PATH REPORTING

TECHNICAL FIELD

The invention relates to computer networking and, more specifically, to providing traffic engineering within a network.

BACKGROUND

Routing devices within a network, often referred to as routers, maintain tables of routing information that describe available routes through the network. Network routers maintain routing information that describes available routes through the network. Upon receiving a packet, a router examines information within the packet and forwards the packet in accordance with the routing information. In order to maintain an accurate representation of the network, routers exchange routing information in accordance with one or more routing protocols, such as an interior gateway protocol (IGP) or Border Gateway Protocol (BGP).

The term "link" is often used to refer to the connection between two devices on a network. The link may be a physical connection such as a copper wire, a coaxial cable, any of a host of different fiber optic lines or a wireless connection. In addition, network devices may define "virtual" or "logical" links, and map the virtual links to the physical links. In other words, the use of virtual links provides a degree of abstraction.

Traffic engineering may be applied within a network for a variety of purposes, such as to route traffic around network failures or congested links or to direct certain traffic along a particular path through the network that meets a set of explicit requirements. For example, a router within the network may establish a traffic engineering label switched path (TE LSP) in a Multi-Protocol Label Switching (MPLS) network using a resource reservation protocol, such as the Resource Reservation Protocol with Traffic Engineering extensions (RSVP-TE). Once a packet is mapped on to an Traffic Engineering LSP (TE LSP) by an ingress label edge router (LER) for the LSP, the intermediate devices along the TE LSP forward the packet based on labels attached to the packet, rather than making independent forwarding decisions based on the packet destination and the intermediate devices' routing information. A Traffic Engineering MPLS LSP may in this way be used to define and implement a path from a source device to a destination device that satisfies requirements for certain traffic transported by the network.

The explicit requirements that must be satisfied by an LSP represent constraints upon the set of possible paths from the source device to the destination device. These constraints, such as available bandwidth, direct shortest path first algorithms to compute a satisfactory path with regard to the constraint metrics. The network routers then establish an LSP that matches the computed path and, using the LSP, forward traffic in a manner that satisfies the constraints. Constrained shortest path first (CSPF) thus represents a fundamental building block for traffic engineering systems, including MPLS and Generalized MPLS (GMPLS) networks. However, constraint-based path computation in large, multi-domain, multi-region, and/or multi-layer networks is complex and may in some instances require cooperation between elements in different administrative domains that do not exchange sufficient traffic engineering information for computing multi-domain paths.

Network operators may augment the functionality of their networks by introducing one or more path computation elements (PCEs) that allow the network routers to offload path computation. A PCE establishes PCE communication protocol (PCEP) sessions with one or more path computation clients (PCCs) through a network. Path computation clients, such as routers, issue path computation requests to the PCE using their respective PCEP sessions. The PCE applies constraints provided in a path computation request to compute the path of a LSP through a path computation domain that satisfies the constraints. The PCE then returns the path to the requesting PCC of an ingress LER for the TE LSP, effectively augmenting the network path computation functionality. A PCE may be stateless or stateful. In general, a stateless PCE does not maintain state describing TE LSPs in the network. A stateful PCE, on the other hand, maintains state for a subset of TE LSPs in the network, allowing the stateful PCE to utilize more sophisticated LSP path computation algorithms in some instances.

SUMMARY

In general, techniques are described for reporting, by non-ingress routers for traffic engineering label switched paths (TE LSPs) and to a path computation element, actual paths taken by the TE LSPs through the network. For example, a router may receive an LSP signaling message for a TE LSP initiated by an ingress LER for the TE LSP. The LSP signaling message may include either an RSVP-TE Path message that is a request to bind labels for the TE LSP or an RSVP-TE Resv message distributing a bound label in accordance with such a request, for instance. The LSP signaling message includes a route object that indicates the path taken by the TE LSP from the ingress LER to the egress LER. In response to receiving the LSP signaling message and based on the route object, the router generates and sends an LSP path report message that indicates the path taken by the TE LSP to a PCE for the path computation domain that includes the router.

In some examples, a PCE communication protocol (PCEP) is extended to support LSP path report messages that indicate the path taken by a TE LSP and identify a reporting router for the TE LSP as an ingress LER, transit label switching router (LSR), or egress LER for the TE LSP. A path computation client (PCC), such as the router described above, may generate a PCEP path computation state report message as an LSP path report message to indicate the path and whether the PCC is an ingress, transit, or egress router for the TE LSP being reported to the PCE.

By expanding the roles in which routers report TE LSP paths from ingress LERs for the TE LSPs to transit LSRs and egress LERs for the TE LSPs, the techniques may improve visibility of the PCE of TE LSPs in the path computation domain with potentially salutary effects on overall path computation. In mixed network deployments, where an ingress LER for a TE LSP may not have a capability to report the TE LSP path to the PCE (e.g., is not a PCC), the techniques may permit reporting the TE LSP path to the PCE by any other router along the TE LSP path that is capable (e.g., is a PCC with PCEP session with the PCE). In this way, the techniques may increase visibility of TE LSPs in the network by increasing the number of TE LSP paths reported to the PCE, for any router along an actual path for a TE LSP may report the TE LSP path to the PCE and not merely the ingress LER. The techniques may facilitate improved optimization of path computation by the PCE using the increased path data.

The techniques may in some cases also facilitate a reduction in the number of concurrent PCEP sessions for a PCE.

For instance, PCEP may be enabled only for those routers operating as ingress LERs with TE LSPs controlled (either directly or by delegation) by a PCE as described herein, and in such cases the PCE may nevertheless receive actual paths from transit LSRs or egress LERs for TE LSPs that are not controlled by the PCE. For example, an ingress LER that is PCEP-capable but does not have a PCEP session with the PCE may be configured with and perform path computation for a TE LSP signaled in the path computation domain. However, the PCE may nevertheless receive the actual path for the TE LSP from the egress LER that does have a PCEP session with the PCE.

In one example, a method comprises receiving, by a first network device that is not an ingress label edge router (LER) for a traffic engineering label switched path (TE LSP) and from a second network device, an LSP path signaling message that includes a route object having a first indication of at least a sub-path of a path for the TE LSP through a network; generating, by the first network device in response to the LSP path signaling message and based at least in part on the route object, an LSP path report message that includes a second indication of the at least the sub-path of the path for the TE LSP; and sending, by the first network device to a path computation element (PCE), the LSP path report message to notify the PCE of the at least the sub-path of the path for the TE LSP.

In another example, a first network device comprises one or more processors coupled to a memory; a routing protocol daemon configured for execution by the one or more processors to receive, from a second network device, an LSP path signaling message that includes a route object having a first indication of at least a sub-path of a path for a traffic engineering label switched path (TE LSP) through a network, wherein the first network device is not an ingress label edge router (LER) for the TE LSP; and a path computation client configured for execution by the one or more processors to generate, in response to the LSP path signaling message and based at least in part on the route object, an LSP path report message that includes a second indication of the at least the sub-path of the path for the TE LSP, wherein the path computation client is further configured to send, to a path computation element (PCE), the LSP path report message to notify the PCE of the at least the sub-path of the path for the TE LSP.

In another example, a system comprises a software-defined networking (SDN) controller for a network, the SDN controller comprising a path computation element (PCE) for a path computation domain of a network; a second network device of the network; a first network device of the network, the first network device configured to receive, from a second network device, an LSP path signaling message that includes a route object having a first indication of at least a sub-path of a path for a traffic engineering label switched path (TE LSP) through a network, wherein the first network device is not an ingress label edge router (LER) for the TE LSP, wherein the first network device is further configured to generate, in response to the LSP path signaling message and based at least in part on the route object, an LSP path report message that includes a second indication of the at least the sub-path of the path for the TE LSP, and wherein the first network device is further configured to send, to the SDN controller, the LSP path report message to notify the SDN controller of the at least the sub-path of the path for the TE LSP.

In another example, a first network device comprising one or more processors coupled to a memory; a routing protocol daemon configured for execution by the one or more processors to receive, from a second network device, an LSP path signaling message that includes a route object having a first indication of at least a sub-path of a path for a traffic engineering label switched path (TE LSP) through a network; and a path computation client configured for execution by the one or more processors to generate, in response to the LSP path signaling message and based at least in part on the route object, an LSP path report message that includes a second indication of the at least the sub-path of the path for the TE LSP and an indication that the first network device is one of an ingress label edge router (LER), a transit label switching router, and an egress LER for the TE LSP, wherein the path computation client is further configured to send, to a path computation element (PCE), the LSP path report message to notify the PCE of the at least the sub-path of the path for the TE LSP.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
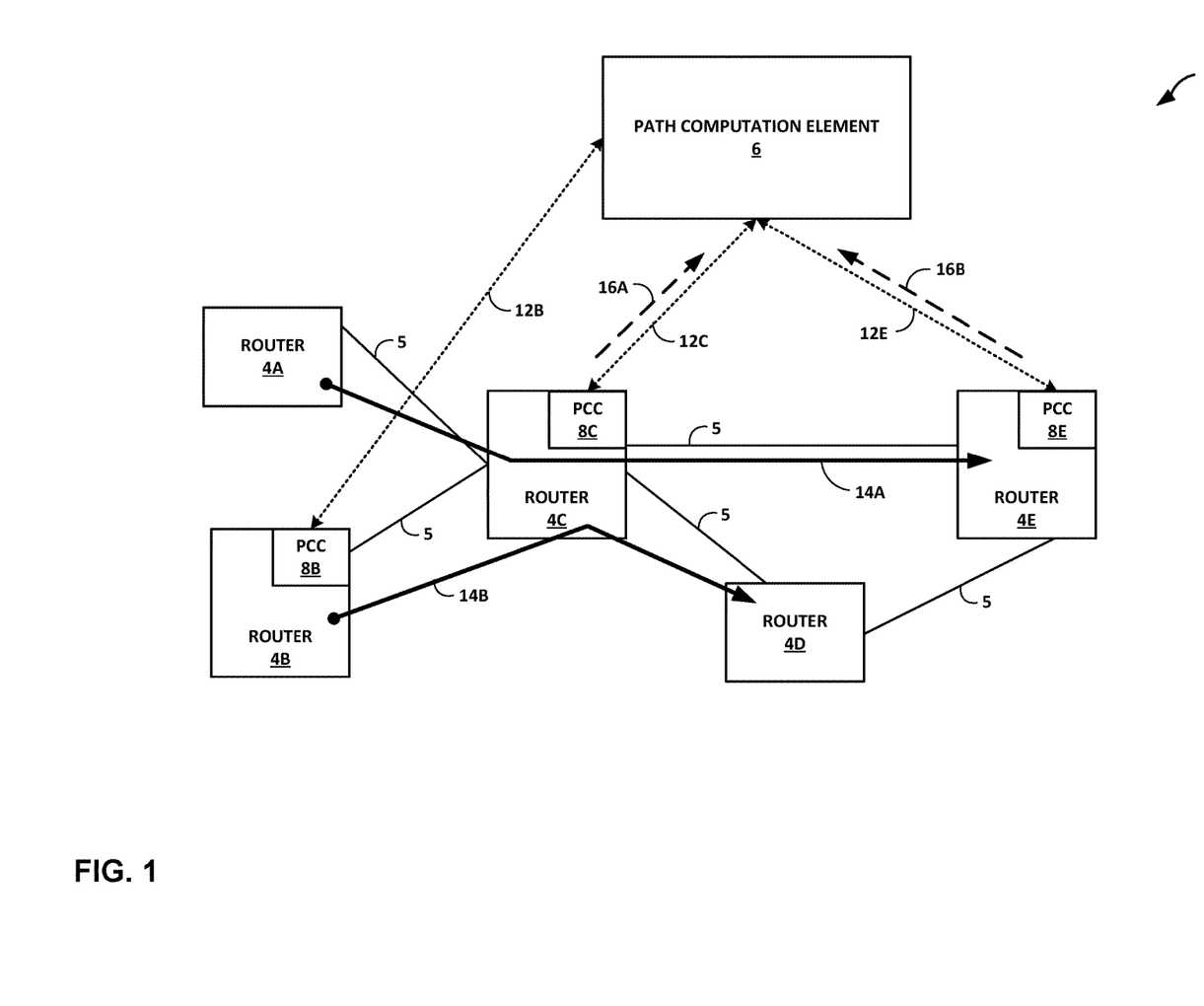
FIG. 1 is a block diagram illustrating a network system in which non-ingress label edge routers for traffic engineering label switched paths report actual paths for the traffic engineering label switched paths, in accordance with techniques of this disclosure.

FIG. 1 is a block diagram illustrating a network system in which non-ingress label edge routers for traffic engineering label switched paths report actual paths for the traffic engineering label switched paths, in accordance with techniques of this disclosure. In this example, network system 2 includes path computation element (PCE) 6 and a plurality of routers 4A-4E ("routers 4") interconnected in the illustrated topology by network links. Routers 4 are members of a path computation domain served by PCE 6. The path computation domain may include, for example, an Interior Gateway Protocol (e.g., Open Shortest Path First (OSPF) or Intermediate System-to-Intermediate System (IS-IS)) area, an Autonomous System (AS), multiple ASes within a service provider network, multiple ASes that span multiple service provider networks. In various examples, different combinations of routers 4 may include member routers of multiple ASes. As such, network links connecting routers 4 may be interior links, inter-AS transport links, or some combination thereof. While illustrated and described with respect to routers, the techniques may be applicable to any network device that implements a resource reservation protocol and Multi-Protocol Label Switching (MPLS) or Generalized MPLS (GMPLS). Network system 2 may represent a service provider network and, in some examples, include hundreds of routers.

PCE 6 may use traffic engineering and LSP state information learned from routers 4 to apply constraints to compute network paths for MPLS traffic engineering LSPs (TE LSPs) both in response to requests from any of routers 4 and autonomously. PCE 6 is an application or other process executing on, for instance, a network node such as one of routers 4, a component of a network node, an in-network or out-of-network server, or a software-defined networking (SDN) controller. To obtain traffic engineering information for storage in a traffic engineering database (not shown in FIG. 1), PCE 6 may execute one or more network routing protocols, extended to carry traffic engineering information, to listen for routing protocol advertisements that carry such traffic engineering information. PCE 6 computes paths for TE LSPs by applying bandwidth and other constraints to learned traffic engineering information. A resulting path may be confined to a single domain or may cross several domains. Additional details regarding an SDN controller that includes a path computation element are found in U.S. patent application Ser. No. 14/042,614, filed Sep. 10, 2013 and entitled "Software-defined Network Controller;" in U.S. patent application Ser. No. 13/843,500, filed Mar. 15, 2013 and entitled "Physical Path Determination for Virtual Network Packet Flows;" U.S. patent application Ser. No. 14/500,736, filed Sep. 29, 2014; and PCT International Patent Application PCT/US13/44378, filed Jun. 5, 2013, each of which is incorporated herein by reference in its entirety.

Routers 4C, 4E include respective path computation clients 8B, 8C, 8E ("PCCs 8") that communicate using a corresponding one of extended PCE communication protocol (PCEP) sessions 12B, 12C, 12E. Reference herein to a PCC may additionally refer to router or other network device that includes the PCC. Each of PCCs 8 is an application or other process executed by the router that establishes a PCEP session 12 with which to request path computation from PCE 6 or otherwise operating to implement techniques described in this disclosure. A PCEP session 12 may operate over Transport Control Protocol (TCP) using a well-known port.

Routers 4 may be configured with TE LSPs. In some cases, a router 4 may compute a path for a configured TE LSP and signal the TE LSP in network system using a resource reservation protocol, such as Resource Reservation Protocol with Traffic Engineering extensions (RSVP-TE), to reserve resources along the computed path and establish TE LSPs to carry traffic mapped to the LSPs. In some cases, any of PCCs 8 for a router 4 configured with a TE LSP may issue, via PCEP sessions 12, a path computation request to PCE 6 for the TE LSP. For each requested TE LSP, the path computation request may include a required bandwidth, a setup/holding priority, the source and destination network addresses, delegation and administration flags, administrative data, and metric data. PCE 6 may reply with a computed path for a requested TE LSP when the PCE 6 determines a path using the learned traffic information that satisfies the constraints.

Upon receiving a response from PCE 6, the router 4 uses a resource reservation protocol to signal the TE LSP along the computed path. Additional details regarding PCEP may be found in "Path Computation Element (PCE) Communication Protocol (PCEP)," Network Working Group, Request for Comment 5440, March 2009; and in "PCEP Extensions for Stateful PCE," version 11, PCE Working Group of the Internet Engineering Task Force, Apr. 20, 2015; which are incorporated herein by reference in their respective entireties. Additional details regarding RSVP-TE may be found in "RSVP-TE: Extensions to RSVP for LSP Tunnels", Network Working Group, Request for Comments 3209, December 2001; and in "Resource ReSerVation Protocol (RSVP)," Network Working Group, Request for Comments 2205, September 1997, which are each incorporated herein by reference in their respective entireties.

Because not all routers 4 include a corresponding PCC 8, network system 2 represents a mixed deployment environment with regard to path computation clients. As a result, routers 4 that do not have a corresponding PCC 8 (or have a corresponding PCC 8 that is not configured to report state for a given TE LSP) are unable to report state, such as actual paths signaled, in the event such routers 4 without PCCs 8 operate as ingress label edge routers (LERs) that independently initiate signaling of TE LSPs within network 2 such that PCE 6 may otherwise be unaware of actual paths of such TE LSPs. In some cases, a router 4 may delegate control of a TE LSP to PCE 6 such that the PCE 6 directs the router to signal a path according to a computed path pushed down to the PCC for the router. For example, router 4B may delegate, via PCEP session 12B, control of TE LSP 14B.

In the illustrated example network system 2, router 4A establishes TE LSP 14A to router 4E. Router 4A is an ingress LER for TE LSP 14A, router 4E is an egress LER for TE LSP 14A, and router 4C is a transit label switching router (LSR) for TE LSP 14A. Router 4B establishes TE LSP 14B to router 4D. Router 4B is an ingress LER for TE LSP 14B, router 4D is an egress LER for TE LSP 14B, and router 4C is a transit LSR for TE LSP 14B. Only two TE LSPs are shown for ease of illustration. In various examples, network system 2 may include any number of TE LSPs connecting different pairs of routers 4. In addition, TE LSPs may recursively include other TE LSPs as virtual links. For example, TE LSP 14B may include, as a virtual link, a TE LSP (not shown) that tunnels labeled traffic from router 4C to router 4D.

To establish TE LSP 14A, router 4A as the ingress LER for the TE LSP uses an LSP signaling protocol, such as RSVP-TE. Router 4A sends an LSP label request path signaling message that is forwarded along a requested path to request that routers 4 along the requested path bind labels for TE LSP 14A. In response, each router 4 along the requested path binds a label for TE LSP 14A and sends a LSP label reservation path signaling message to the upstream router that includes the label bound by the router for TE LSP 14. Each type of LSP signaling message includes at least one route object that indicates a path taken by the TE LSP being signaled.

The RSVP-TE Path message (hereinafter, "Path message") is an LSP label request path signaling message for the RSVP-TE LSP signaling protocol. The RSVP-TE Resv message (hereinafter, "Resv message") is an LSP label reservation path signaling message for RSVP-TE. Although applicable to other LSP signaling protocols, the techniques of this disclosure are described hereinafter with respect to RSVP-TE (also referred to herein simply as "RSVP").

A Path message includes an Explicit Route Object (ERO), which is a route object indicates a path to be assigned to a TE LSP by encapsulating a concatenation of hops which constitute the explicitly routed path through network system 2 for the TE LSP being signaled, as described in RFC 3209. Routers 4 forward the Path message toward its destination along a path specified by the ERO. Each of routers 4 may record the ERO in a path state block. Routers 4 may also modify the ERO before forwarding the Path message. For purposes of route recording, a Path message may also include a Record Route Object (RRO), which is a route object that indicates an actual path taken by the TE LSP being signaled, as described in RFC 3209. Routers 4 may record an RRO received in a Path message to the path state for the TE LSP being signaled.

The Resv messages propagate upstream from the egress LER toward the ingress LER for the TE LSP, following the path state in routers 4 created by the Path message, in reverse order. If the path state was created in routers 4 by use of an ERP, then the Resv message will follow the reverse path of the ERO. Each router 4 that receives a Resv message, for a TE LSP and containing a label, uses the label for outgoing traffic associated with the TE LSP. If the router 4 is not the ingress LER, the router 4 allocates a new label and send the label in a Resv message to the previous hop (upstream) for the TE LSP. When the Resv message reaches the ingress LER, the TE LSP is established. In cases in which a TE LSP is being signaled with route recording, a Resv message includes an RRO that records the actual path taken by the TE LSP being signaled, as described in RFC 3209. Routers 4 may record an RRO received in a Resv message to the path state for the TE LSP being signaled.

For a TE LSP being signaled with route recording, each router 4 along the actual path for the TE LSP receives indications of the complete actual path from route objects in received Path and Resv messages for the TE LSP. The Path message RRO received by a router 4 includes the complete actual path from the ingress LER to the router 4, and the Resv message RRO received by the router 4 includes the complete actual path from the router 4 to the egress LER. For the boundary cases of the ingress LER and egress LER, the ingress LER receives the complete actual path in a Resv message RRO, and the egress LER receives the complete actual path in a Path message RRO.

In accordance with techniques described in this disclosure, in response to receiving a route object in a Path or Resv message for a TE LSP being signaled, PCCs 8 may send an indication of the actual path for the TE LSP to PCE 6 via PCEP sessions 12. For example, router 4C as a transit LSR for TE LSP 14A receives a Path message having an ERO for TE LSP 14A. In response, PCC 8C of router 4C may send the ERO to PCE 6 via PCEP 12C as an indication of the actual path for TE LSP 14A. Likewise, router 4E as an egress LER for TE LSP 14A receives a Path message having the ERO for TE LSP 14A. In response, PCC 8E of router 4E may send the ERO to PCE 6 via PCEP 12E as an indication of the actual path for TE LSP 14A. In some examples, PCCs 8 may further report to PCE 6 an indication of whether TE LSPs 14 have path protection by way of, e.g., a bypass LSP. In some cases, PCCs 8 may further report the path for the bypass LSP to PCE 6.

As another example, router 4C may receive a Path message from router 4B for TE LSP 14A, the Path message including an RRO recording the actual path for TE LSP 14A from router 4B to router 4C. Router 4C may subsequently receive a Resv message from router 4E, the Resv message including an RRO recording the actual path for TE LSP 14A from router 4C to router 4E. PCC 8C of router 4C may send, to PCE 6, the RRO received in the Path message and/or the RRO received in the Resv message as indications of the actual path for TE LSP 14A. Likewise, router 4E may receive a Path message from router 4C for TE LSP 14A, the Path message including an RRO recording the actual path for TE LSP 14A from router 4C to router 4E. In response, PCC 8E of router 4E may send the RRO to PCE 6 via PCEP 12E as an indication of the actual path for TE LSP 14A. Similarly as for TE LSP 14B, PCC 8C of router 4C or PCC 8E of router 4E may send LSP path report messages according to the above-described techniques to report an actual path of TE LSP 14B.

In this way, even though router 4A that is the ingress LER for TE LSP, if 14A is incapable of reporting the actual path for TE LSP 14A to PCE 6, a transit LSR (router 4C) and egress LER (router 4E) for TE LSP 14A report the actual path to the PCE 6 to notify the PCE 6 of the existence of and path taken by TE LSP 14A through network system.

In the example of FIG. 1, PCCs 8 send indications of the actual path for TE LSP 14A via PCEP sessions 12 using LSP path report messages 16A, 16B. LSP path report message 16A from PCC 8C to PCE 6 via PCEP session 12C includes an indication the actual path for TE LSP 14A. Each of LSP path report messages 16A, 16B may represent a PCEP Path Computation State Report (PCRpt) message that includes the indication of the actual path of TE LSP 14A. The indication of the actual path may be encoded in an RRO. The indication of the actual path may indicate only a sub-path of the actual path in some cases, e.g., a partial list of routers 4 that makes up the actual path rather than a complete list of routers 4.

In some examples, each of LSP path report messages 16A, 16B includes an indication of the role of the reporting router 4 with respect to the TE LSP being reported. A role for a router with respect to a TE LSP may be as an ingress LER, transit LSR, or egress LER. For examples, LSP path report message 16A from PCC 8C may include an indication that router 4C is a transit LSR for TE LSP 14A. LSP path report message 16B from PCC 8E may include an indication that router 4E is an egress LER for TE LSP 14A. A router 4 may determine its role with respect to a TE LSP 14 by, e.g., processing a received Path message that specifies the ingress LER (sender) and egress LER (destination) of the TE LSP being signaled to determine whether the router is the ingress LER or egress LER (or otherwise a transit LSR). As another example, a router 4 may determine it role by processing a received Resv message, which identifies a TE LSP with path state already stored by the router. The path state identifies the ingress LER and egress LER for the TE LSP being signaled, and the router may therefore determine from the path state whether its role is that of ingress LER, egress LER, or transit LSR. By reporting the role of the router with respect to a TE LSP, the reporting router may reduce a processing load on the PCE 6, which would process the reported actual path to determine a role of the reporting router with respect to the TE LSP.

In some examples, an operator for network system 2 (such as a service provider network operator) may purposefully disable PCC functionality for routers 4A, 4B, for instance. Because the techniques facilitate LSP path reporting by transit LSR 4C, this may reduce a number of concurrent PCEP sessions 12 for PCE 6. For instance, PCEP may be enabled only for those routers 4 operating as ingress LERs with TE LSPs controlled (either directly or by delegation) by a PCE 6, and in such cases the PCE may nevertheless receive actual paths from transit LSRs or egress LERs for TE LSPs that are not controlled by the PCE 6. In the example of network system 2, TE LSP 14A is controlled by router 4A and not by PCE 6, while control of TE LSP 14B is delegated by router 4B to PCE 6. The operator may therefore disable PCEP for router 4A without reducing the level of actual LSP path reporting to PCE 6. In some examples, ingress routers 4 for a TE LSP may use an extended form of RSVP Path messages when signaling the TE LSP, according to this disclosure, to indicate whether the ingress router 4 controls the TE LSP or has delegated the TE LSP. In some examples, ingress routers 4 for a TE LSP may use an extended form of RSVP Path messages when signaling the TE LSP, according to this disclosure, to indicate whether a downstream router 4 that receives an RSVP Path message for a TE LSP should report the actual path of the TE LSP to the PCE 6. In such cases, a downstream router 4 may report the actual path of the TE LSP to the PCE 6 only if reporting is indicated in the Path message for the TE LSP. The above indications may be implemented as flags in the Session or Common Header sections of a Path message.

By expanding the roles in which routers 4 report TE LSP paths from ingress LERs for the TE LSPs to transit LSRs and egress LERs for the TE LSPs 14A, 14B, the techniques may improve visibility of the PCE of TE LSPs in the path computation domain with potentially salutary effects on overall path computation. In mixed network deployments, where ingress LER 4A for TE LSP 14A does not have a capability to report the TE LSP 14A path to the PCE 6, the techniques may permit reporting the TE LSP 14A path to the PCE 6 by routers 4C, 4E along the TE LSP 14A path that have PCEP sessions 12 with PCE 6. In this way, the techniques may increase the number of TE LSP paths reported to the PCE 6, for any router 4 along an actual path for a TE LSP may report the TE LSP path to the PCE 6 and not merely the ingress LER. Because the techniques may increase the number of established TE LSPs that are reported to the PCE 6, the techniques may facilitate improved optimization of path computation by the PCE 6 using the increased path data.

Figure 2:
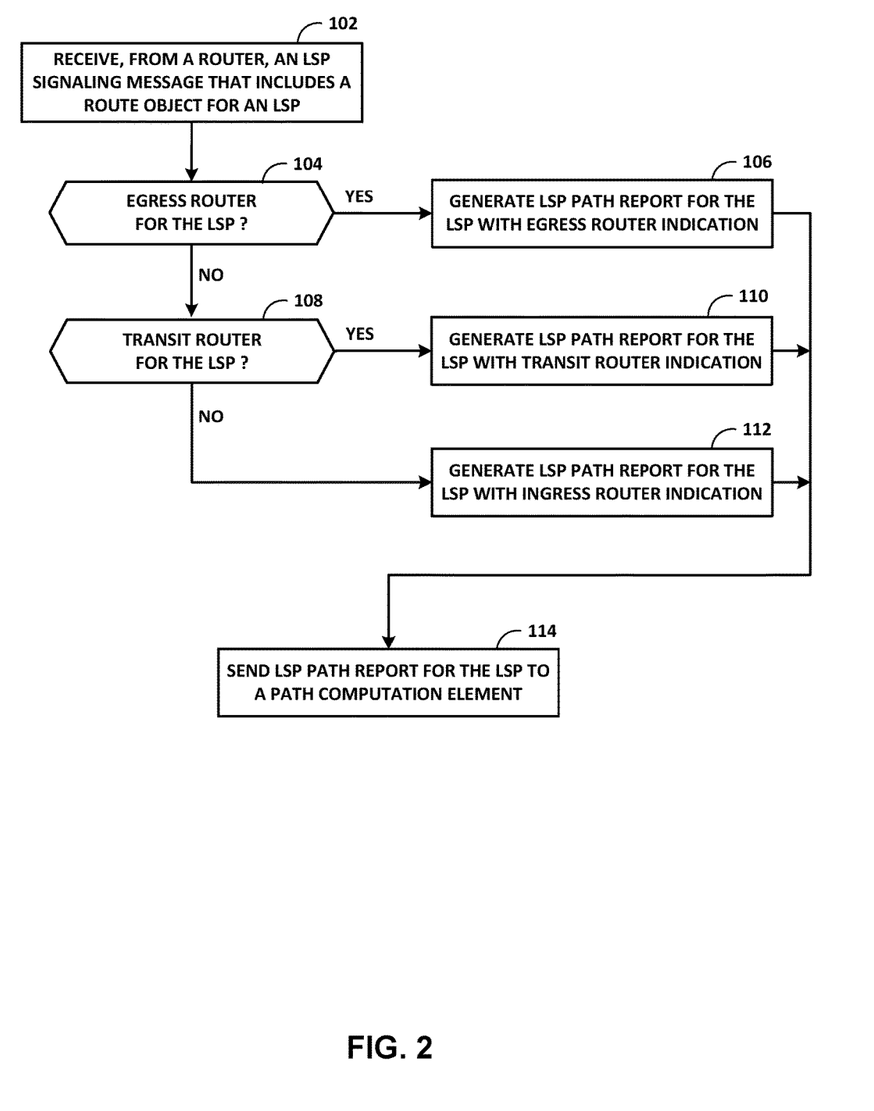
FIG. 2 is a flowchart illustrating an example mode of operation for a router according to techniques described in this disclosure.

FIG. 2 is a flowchart illustrating an example mode of operation for a router according to techniques described in this disclosure. The techniques are described with respect to router 4C of FIG. 1 but may be performed by any router or network device that performs LSP path signaling. Router 4C receives, from another router 4, an LSP path signaling message that includes a route object for a TE LSP being signaled (102). For example, router 4C may receive an RSVP Path message including an ERO and, in some cases, an RRO from router 4A. As another example, router 4C may receive an RSVP Resv message including an RRO from router 4E. In response to receiving the LSP signaling message, if router 4C is an egress LER for the TE LSP (YES branch of 104), then router 4C generates an LSP path report that includes an indication of an actual path for the TE LSP and also includes an indication that the originator of the LSP path report (i.e., router 4C) is an egress LER for the TE LSP (106). If router 4C is a transit LSR for the TE LSP (YES branch of 108), then router 4C generates an LSP path report that includes an indication of an actual path for the TE LSP and also includes an indication that the originator of the LSP path report (i.e., router 4C) is a transit LSR for the TE LSP (110). If router 4C is an ingress LSR for the TE LSP (NO branch of 108), then router 4C generates an LSP path report that includes an indication of an actual path for the TE LSP and also includes an indication that the originator of the LSP path report (i.e., router 4C) is an ingress LER for the TE LSP (112). Router 4C sends the generated LSP path report for the TE LSP being signaled to PCE 6 (114).

In some cases, a TE LSP may span multiple domains managed by corresponding instances of PCEs. For example, a first PCE (or SDN controller) may manage a first domain (such as an autonomous system), while a second PCE manages a second domain, and a TE LSP may have an ingress LER in the first domain but an egress LER in the second domain. The techniques described herein, i.e., reporting actual paths by transit and egress routers for TE LSPs, may provide the PCE for the second domain with visibility and an actual path of the TE LSP, even though the ingress LER for the TE LSP will report the actual path to the PCE for the first domain and not to the PCE for the second domain. This may be particularly useful in a multi-vendor deployment in which different types of PCEs are used.

Figure 3:
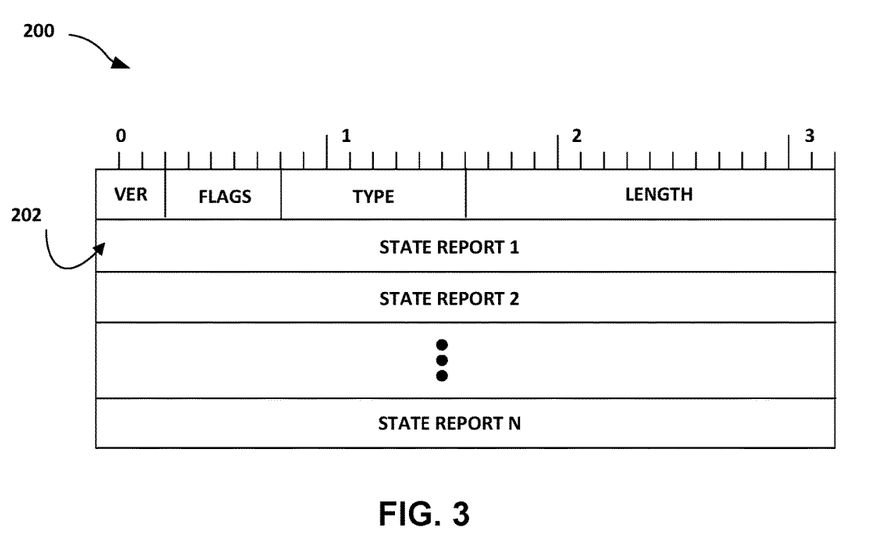
FIG. 3 is a block diagram illustrating an example format for a path computation LSP state report message that facilitates TE LSP path reporting according to techniques described in this disclosure.

FIG. 3 is a block diagram illustrating an example format for a path computation LSP state report ("PCRpt") message that facilitates TE LSP path reporting according to techniques described in this disclosure. PCRpt message 200 may represent any of LSP path report messages 16A, 16B of FIG. 1, for example. PCRpt message 200 may represent a PCEP PCRpt message modified according to techniques described herein to indicate respective role of the reporting router with respect to one or more TE LSPs being reported to PCE 6.

PCRpt message 200 includes the common header for PCEP defined in RFC 5440. This common header specifies the PCEP version number ("VER"), currently defined common flags ("FLAGS"), the message type ("TYPE"), and the message length ("LENGTH") that specifies the total length of PCRpt message 200 in bytes, including the common header. The message type field of PCRpt message 200, declares to the recipient that the message is of type "PCRpt." The message type value may be 8 in some instances to indicate type "PCRpt."

PCRpt message 200 additionally includes one or more state reports for respect TE LSPs, described hereinafter with respect to state report 202 (illustrated as "STATE REPORT 1"). State report 202 specifies an LSP object, described more fully with respect to FIG. 4, and indicates an actual path taken by the TE LSP being reported by the state reports. State report 202 may include an RRO object to indicate the actual path for the reported TE LSP and optionally includes LSPA, BANDWIDTH, METRIC, as defined in RFC 5440. The LSP attributes (LSPA) object specifies various TE LSP attributes. The BANDWIDTH object specifies a bandwidth for the TE LSP. The METRIC object may specify the metric that has been optimized for the TE LSP (e.g., an IGP metric, a TE metric, hop counts).

Figure 4:
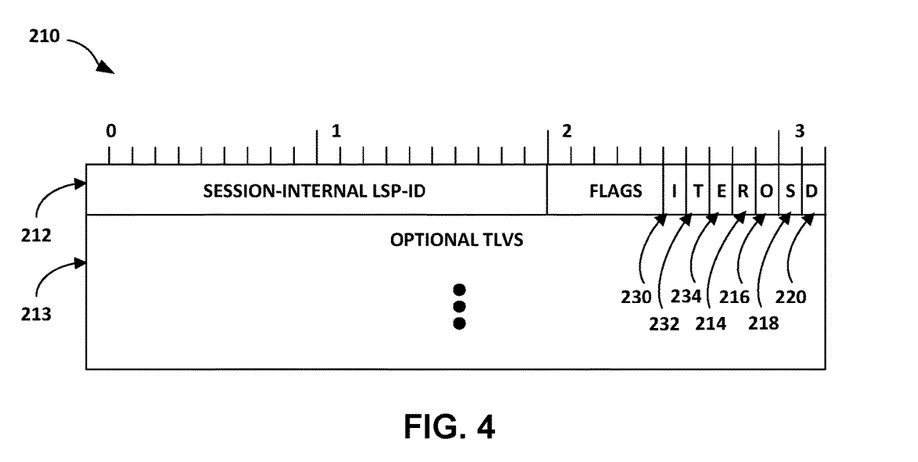
FIG. 4 is a block diagram illustrating an example format for an LSP object carried by a path computation LSP state report message, according to techniques of this disclosure.

FIG. 4 is a block diagram illustrating an example format for an LSP object carried by a PCRpt message, according to techniques of this disclosure. LSP object 210 includes SESSION-INTERNAL LSP-ID field 212 that specifies an LSP identifier (LSP-ID) of the target TE LSP for the state report (e.g., state report 202) that includes LSP object 210. SESSION-INTERNAL LSP-ID field 212 is a per-PCEP session identifier for the target LSP. That is, for each of its PCEP sessions, a PCC creates a unique LSP-ID for each LSP that it owns and maps the LSP-ID to the symbolic name for the corresponding, target LSP. The PCC may communicates the mapping in PCRpt messages to PCEs. Subsequent extended PCRpt messages may then address the target LSP by its LSP-ID, which is specifies by SESSION-INTERNAL LSP-ID field 212 of LSP object 210.

Flags 230, 232, 234 indicate the role, with respect to a TE LSP, of the router that sends a PCRpt message that includes a state report reporting the TE LSP and including LSP object 210. Ingress flag 230 may be set to indicate that the router role is as an ingress LER for the TE LSP. Transit flag 232 may be set to indicate that the router role is as a transit LSR for the TE LSP. Egress flag 234 may be set to indicate that the router role is as an egress LER for the TE LSP. In some example formats for LSP object 210, a 2-bit field may be set with a predefined value that indicates the reporting router role for the target TE LSP. For example, a value 0 may indicate ingress LER, a value 1 may indicate egress LER, and a value 2 may indicate a transit LSR.

LSP object 210 may also include a delegate flag 220, operational flag 216, synchronization done flag 218, and remove flag 214. LSP object 210 may optionally include one or more optional TLVs 213 that further describe states and operations for a target TE LSP, as described in "PCEP Extensions for Stateful PCE," referenced above.

Figure 5:
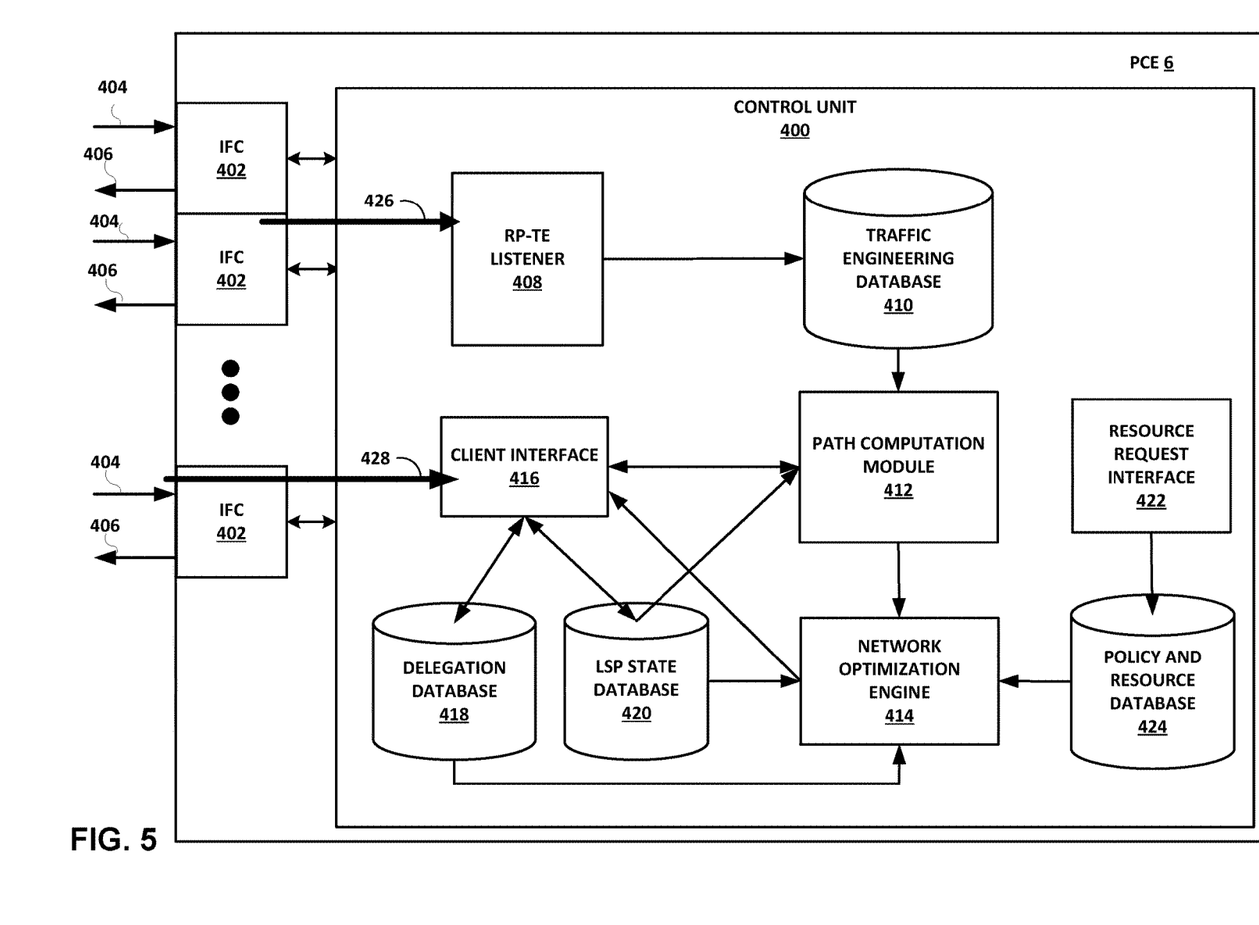
FIG. 5 is a block diagram illustrating an example instance of a stateful path computation element that establishes and uses PCEP sessions to receive LSP path reports according to techniques described in this disclosure.

FIG. 5 is a block diagram illustrating an example instance of a stateful path computation element that establishes and uses PCEP sessions to receive LSP path reports according to techniques described in this disclosure. Stateful PCE 6, in this example, includes control unit 400 coupled to interface cards 402 ("IFCs 402") for receiving packets via input links 404 ("input links 44") and sending packets via output links 406 ("output links 406").

Control unit 400 may comprise one or more processors (not shown in FIG. 5) that execute software instructions, such as those used to define a software or computer program, stored to a computer-readable storage medium, such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, control unit 400 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Routing protocol with traffic engineering extensions listener 408 ("RP-TE listener 408") is a process of control unit 408 that executes one or more routing protocols extended to advertise and receive traffic engineering (TE) information 426. RP-TE listener 408 may in some instances be a passive listener and eschew routing protocol advertisements. RP-TE 408 may, for example, execute Intermediate System-to-Intermediate System with TE extensions (IS-IS-TE) or Open Shortest Path First with TE extensions (OSPF-TE). In some instances, RP-TE listener 408 executes Border Gateway Protocol to receive advertised TE information for inter-AS and other out-of-network links. Additional details regarding an example PCE 6 are found in U.S. patent application Ser. No. 14/042,614, referenced above.

Traffic engineering information received by RP-TE listener 408 includes topology information for the path computation domain served by PCE 6. Such TE information includes one or more of the link state, administrative attributes, and metrics such as bandwidth available for use at various LSP priority levels of links connecting routers of the domain. RP-TE listener 408 stores TE information in traffic engineering database (TED) 410, which is stored by a computer-readable storage medium for use in path computation.

Client interface 416 of control unit 400 implements PCE communication protocol (PCEP) to receive and send PCEP messages described in this disclosure. That is, client interface 416 establishes PCEP sessions with one or more path computation clients (PCCs) operating on MPLS-enabled routers in the network. Via the PCEP sessions, client interface 416 receives LSP state reports 428 that include up-to-date LSP state including indications of actual paths for TE LSPs owned by the corresponding clients, which client interface 416 stores to LSP state database 420. LSP state reports 428 may be included in PCRpt messages. LSP state, received by client interface 416 and stored to LSP state database 420, for an LSP may include, for example, the LSP status (e.g., up/down), symbolic name for inter-PCEP session persistence, LSP attributes such as setup priority and hold priority, number of hops, the reserved bandwidth, a metric that has been optimized for the TE LSP (e.g., an IGP metric, a TE metric, or hop counts), and an actual path followed by the TE LSP. In the illustrated example, client interface 416 receives, from a non-ingress router for a TE LSP (i.e. an egress LER or transit LSR), at least one LSP state report 428 in a PCRpt message and including an indication of the actual path taken by the TE LSP through a network. In this way, PCE 6 may receive TE LSP state reports for TE LSPs that are not delegated, computed by, or otherwise known to PCE 6. This may increase the number of signaled TE LSPs known to PCE 6 and improve path optimization by PCE 6 in its path computation domain.

LSP state reports received by client interface 416 may in some case include a delegation that provides access rights to PCE 6 to modify parameters of the target TE LSP. In some instances, the delegation may specify the particular parameters of the target TE LSP that are exposed for modification. Client interface 416 stores such delegation information to delegation database 418, which may associate the delegation information with LSP identifiers that also identify TE LSPs in LSP state database 420. Client interface 416 may also implement functionality for the operation of PCEP to facilitate path computation request/reply messages.

Resource request interface 422 of control unit 400 provides an interface by which applications and/or operators may request TE LSPs having particular characteristics, such as source/destination and guaranteed bandwidth. Applications and operators may also use resource request interface 422 to inspect LSP state information and modify parameters of LSPs identifiable by their respective symbolic names. For example, PCE 6 may receive via resource request interface 422 a resource request message from an application that identifies an LSP by its symbolic name. In response, resource request interface 422 returns an indication of LSP state information for the identified LSP to the application for use by the application to transport application traffic. Resource request interface 422 stores resource requirements corresponding to the requests in policy and resource database 424, which may also store policies that determine the operation of PCE 6, in particular of network optimization engine 414, upon the occurrence of specified conditions.

Network optimization engine 414 executing on control unit 400 uses TE information of TED 410, LSP state information stored to LSP state database 420 including actual paths for TE LSPs received in PCRpt messages for non-ingress routers for the TE LSPs, and/or delegation information stored to delegation database 418 to identify permissible modifications to existing, delegated LSPs that further normative goals of the network operator, which may be expressed in policy and resource database 424. Such goals may include maximizing total throughput and/or fostering bandwidth allocation fairness for requested resources, for instance. Network optimization engine 414 may invoke path computation module 412 of control unit, executes constrained SPF (CSPF) using supplied constraints to determine a set of paths that satisfy the constraints. LSP state information stored to LSP state database 420 may supply constraints and link metrics to path computation module 412 for both passive stateful and active stateful instances of PCE 6.

Figure 6:
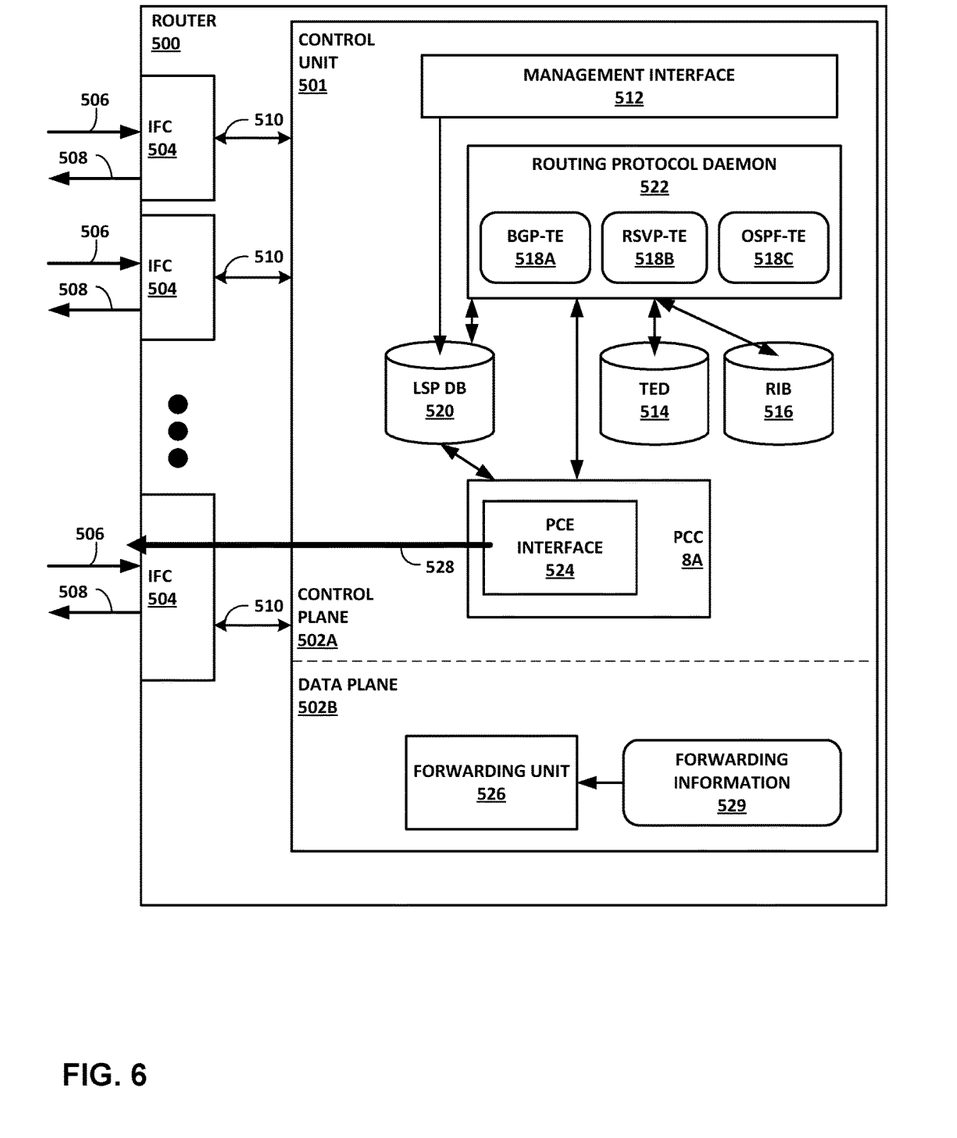
FIG. 6 is a block diagram illustrating an example router that sends indications of actual paths for TE LSPs to a path computation element in accordance with techniques described in this disclosure.

FIG. 6 is a block diagram illustrating an example router that sends indications of actual paths for TE LSPs to a path computation element in accordance with techniques described in this disclosure. For purposes of illustration, router 500 may be described below within the context of an exemplary network system 2 of FIG. 1 and may represent any one of routers 4. Moreover, while described with respect to a particular network device, e.g., a router, the techniques may be implemented by any network device that executes LSP signaling protocols to establish and operate LSPs.

Router 500 includes a control unit 501 and interface cards (IFCs) 504 coupled to control unit 501 via internal links 510. Control unit 501 may include one or more processors (not shown in FIG. 6) that execute software instructions, such as those used to define a software or computer program, stored to a computer-readable storage medium (again, not shown in FIG. 6), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, control unit 501 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

In this example, control unit 501 is divided into two logical or physical "planes" to include a first control or routing plane 502A ("control plane 502A") and a second data or forwarding plane 502B ("data plane 502B"). That is, control unit 501 implements two separate functionalities, e.g., the routing/control and forwarding/data functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 502A of control unit 501 executes the routing functionality of router 500. In this respect, control plane 502A represents hardware or a combination of hardware and software of control unit 501 that implements, in routing protocol daemon (RPD) 522, protocols 518 by which routing information stored in routing information base 516 ("RIB 516") may be determined. RIB 516 may include information defining a topology of a network, such as network 2 of FIG. 1. RPD 522 represents a process or application and may resolve the topology defined by routing information in RIB 516 to select or determine one or more routes through the network. RPD 522 may then update data plane 502B with representations of these routes, where data plane 502B maintains these representations as forwarding information 529.

Routing protocols of protocols 518 executed by RPD 522 include, in this example, Border Gateway Protocol with Traffic Engineering extensions (BGP-TE) 518A and Open Shortest Path First with Traffic Engineering extensions (OSPF-TE) 518C. RPD 522 executes these protocols to advertise and receive routing and traffic engineering information from other routers, including autonomous system border routers of external ASes and routers within a routing domain in which router 4A participates. Various other examples may implement other link-state or vector-distance protocols to exchange traffic engineering with other routers. RPD 522 stores received traffic engineering information in traffic engineering database 514 (illustrated as "TED 514"), which is stored by a computer-readable storage medium. TED 514 may subsume RIB 516 in some instances to store all traffic engineering information in a single data structure. TED 514 may store, for example, one or more of the link state, administrative attributes, and metrics such as bandwidth available for use at various LSP priority levels of links connecting router 4A to other routers of an MPLS domain.

Forwarding or data plane 502B represents hardware or a combination of hardware and software of control unit 501 that forwards network traffic in accordance with forwarding information 529 that includes network destinations of output links 508 as well as MPLS forwarding information such as LSP label mappings (or "label information base") that associate outbound labels and interfaces to inbound labels received on incoming traffic. Data plane 502B includes a forwarding unit 526 that provides high-speed forwarding of network traffic received by interface cards 504 via inbound links 506 to outbound links 508. Forwarding unit 526 may represent a packet forwarding engine (PFE) coupled to one or more IFCs 504. Further details of one example embodiment of a router can be found in U.S. patent application Ser. No. 12/182,619, filed Jul. 30, 2008, and entitled "STREAMLINED PACKET FORWARDING USING DYNAMIC FILTERS FOR ROUTING AND SECURITY IN A SHARED FORWARDING PLANE," which is incorporated herein by reference.

Control plane 502A further includes management interface 512 by which a network management system or in some instances an administrator using a command line or graphical user interface configures label switched paths described in LSP database 520 (illustrated as "LSP DB 520"). LSP database 520 includes LSP configuration data, for example, an LSP destination, setup/hold priorities, path (e.g., an RRO), metrics, and other LSP attributes such as those described herein. LSP database 520 may also include information designating zero or more attributes of each configured LSP as delegable parameters that may be set/modified by a PCE using PCEP to modify the operation of the LSP when set up in the network. LSP attributes may be divided into three categories: (1) non-delegable parameters that RPD 522 applies immediately via RSVP-TE 518B and are neither re-signalled nor overridden by a PCE, (2) delegable parameters that RPD 522 applies when the LSP is re-signaled due, e.g., to LSP failure, and (3) delegable parameters that may be overridden by a PCE and trigger re-signaling by RPD 522. All delegable LSP parameters may include a configured default value that RPD 522 applies when, for example, a PCEP session terminates, the PCE otherwise becomes unavailable, or the PCE returns a delegation. LSP database 520 may further store path state for TE LSPs for which router 500 is operating as a transit LSR or egress LER.

RPD 522 signals LSPs described in LSP database 520 by executing an LSP signaling protocol, which in this instance is Resource Reservation Protocol with Traffic Engineering extensions (RSVP-TE) 518B, that signals other routers in the network to reserve resources and provide MPLS forwarding information to RPD 522 for use in forwarding MPLS packets. Various instances of router 500 may also, or alternatively, use standard Label Distribution Protocol (LDP) to signal LSPs. In addition, RPD 522 executes protocols 518 to receive traffic engineering information that affects the state of LSPs, such as failed links and preempted resources that may result in a down state for LSPs. RPD 522 may associate such LSP state information with corresponding LSPs in LSP database 520 and may further direct PCC 8A to send one or more LSP state reports to a PCE in response, as described in further detail below.

In accordance with techniques of this disclosure, path computation client (PCC) module 8A of control plane 502A mediates communication between RPD 522 and a path computation element. PCC 8A includes PCE interface 524 that implements PCEP to receive and send PCEP messages described in this disclosure. PCE interface 524 also implements functionality for the operation of PCEP to facilitate path computation request/reply messages.

PCE interface 524 establishes PCEP sessions with one or more PCEs and sends, via the PCEP sessions, LSP state reports 528 that include LSP state for TE LSPs described in LSP state information stored by LSP database 520. LSP state reports 528 may be included in PCRpt messages. In this way, PCC 8A synchronizes LSP state between router 500 and the PCEs, including LSP state for TE LSPs for which router 500 is not an ingress LER. LSP state reports 528 may represent examples instances of LSP path report messages 16 of FIG. 1.

The techniques described herein may be implemented in hardware, software, firmware, or any combination thereof. Various features described as modules, engines, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
receiving, by a first network device that is not an ingress label edge router (LER) for a traffic engineering label switched path (TE LSP) and from a second network device, an LSP path signaling message that includes a route object having a first indication of at least a sub-path of a path for the TE LSP through a network;
generating, by the first network device in response to the LSP path signaling message and based at least in part on the route object, an LSP path report message that includes a second indication of the at least the sub-path of the path for the TE LSP; and
sending, by the first network device to a path computation element (PCE) for a path computation domain that includes the ingress LER for the TE LSP, the LSP path report message to notify the PCE of the at least the sub-path of the path for the TE LSP.

2. The method of claim 1,
wherein the LSP path signaling message comprises a Resource Reservation Protocol with Traffic Engineering extensions (RSVP-TE) Path message requesting that the first network device bind a label for the TE LSP and return the label to the second network device, and
wherein the route object comprises one of an Explicit Route Object (ERO) and a Record Route Object (RRO).

3. The method of claim 1,
wherein the LSP path signaling message comprises a Resource Reservation Protocol (RSVP) Resv message that includes a label that is bound for the TE LSP by the second network device, and
wherein the route object comprises one of an Explicit Route Object (ERO) and a Record Route Object (RRO).

4. The method of claim 1, wherein the LSP path report message includes an indication that the first network device is one of a transit label switching router and an egress LER for the TE LSP.

5. The method of claim 1,
wherein the LSP path report message comprises a Path Computation Element Protocol (PCEP) Path Computation State Report (PCRpt) message that includes an LSP state report for the TE LSP, and
wherein sending the LSP path report message comprises sending, by the first network device via a PCEP session with the PCE, the LSP path report message.

6. The method of claim 5,
wherein the PCRpt message includes an LSP state report for the TE LSP, and wherein the LSP state report includes at least one flag to indicate that the first network device is one of a transit label switching router and an egress LER for the TE LSP.

7. The method of claim 1, wherein the first network device is one of a transit label switching router and an egress LER for the TE LSP.

8. The method of claim 1, wherein the second indication of the at least the sub-path of the path for the TE LSP comprises one of an Explicit Route Object (ERO) and a Record Route Object (RRO).

9. The method of claim 1, further comprising:
signaling, by the ingress LER for the TE LSP in response to computing a computed path for the TE LSP, the TE LSP to establish the TE LSP along the computed path; and
receiving, by the ingress LER for the TE LSP from a next hop of the ingress LER for the TE LSP and in response to the signaling, the path for the TE LSP without reporting the path to the PCE.

10. The method of claim 1, further comprising:
signaling, by the ingress LER for the TE LSP in response to receiving a computed path for the TE LSP from the PCE, the TE LSP to establish the TE LSP along the computed path; and
receiving, by the ingress LER for the TE LSP from a next hop of the ingress LER for the TE LSP and in response to the signaling, the path for the TE LSP without reporting the path to the PCE.

11. A first network device comprising:
one or more processors coupled to a memory;
a routing protocol daemon configured for execution by the one or more processors to receive, from a second network device, an LSP path signaling message that includes a route object having a first indication of at least a sub-path of a path for a traffic engineering label switched path (TE LSP) through a network, wherein the first network device is not an ingress label edge router (LER) for the TE LSP; and
a path computation client configured for execution by the one or more processors to generate, in response to the LSP path signaling message and based at least in part on the route object, an LSP path report message that includes a second indication of the at least the sub-path of the path for the TE LSP,
wherein the path computation client is further configured to send, to a path computation element (PCE) for a path computation domain that includes the ingress LER for the TE LSP, the LSP path report message to notify the PCE of the at least the sub-path of the path for the TE LSP.

12. The first network device of claim 11,
wherein the LSP path signaling message comprises a Resource Reservation Protocol with Traffic Engineering extensions (RSVP-TE) Path message requesting that the first network device bind a label for the TE LSP and return the label to the second network device, and
wherein the route object comprises one of an Explicit Route Object and a Record Route Object.

13. The first network device of claim 11,
wherein the LSP path signaling message comprises a Resource Reservation Protocol (RSVP) Resv message that includes a label that is bound for the TE LSP by the second network device, and
wherein the route object comprises one of an Explicit Route Object (ERO) and a Record Route Object (RRO).

14. The first network device of claim 11, wherein the LSP path report message includes an indication that the first network device is one of a transit label switching router and an egress LER for the TE LSP.

15. The first network device of claim 11,
wherein the LSP path report message comprises a Path Computation Element Protocol (PCEP) Path Computation State Report (PCRpt) message that includes an LSP state report for the TE LSP, and
wherein sending the LSP path report message comprises sending, by the first network device via a PCEP session with the PCE, the LSP path report message.

16. The first network device of claim 15,
wherein the PCRpt message includes an LSP state report for the TE LSP, and
wherein the LSP state report includes at least one flag to indicate that the first network device is one of a transit label switching router and an egress LER for the TE LSP.

17. The first network device of claim 11, wherein the first network device is one of a transit label switching router and an egress LER for the TE LSP.

18. The first network device of claim 11, wherein the second indication of the at least the sub-path of the path for the TE LSP comprises one of an Explicit Route Object (ERO) and a Record Route Object (RRO).

19. A system comprising:
a software-defined networking (SDN) controller for a network, the SDN controller comprising a path computation element (PCE) for a path computation domain of a network;
a second network device of the network;
a first network device of the network, the first network device configured to receive, from a second network device, an LSP path signaling message that includes a route object having a first indication of at least a sub-path of a path for a traffic engineering label switched path (TE LSP) through a network, wherein the first network device is not an ingress label edge router (LER) for the TE LSP, and wherein the path computation domain includes the ingress LER for the TE LSP,
wherein the first network device is further configured to generate, in response to the LSP path signaling message and based at least in part on the route object, an LSP path report message that includes a second indication of the at least the sub-path of the path for the TE LSP, and
wherein the first network device is further configured to send, to the SDN controller, the LSP path report message to notify the SDN controller of the at least the sub-path of the path for the TE LSP.

20. The system of claim 19,
wherein the SDN controller is configured to receive the LSP path report, and
wherein the PCE is configured to compute, based on the at least the sub-path of the path for the TE LSP received from the first network device, one or more paths for additional TE LSPs in the path computation domain.

21. A first network device comprising:
one or more processors coupled to a memory;
a routing protocol daemon configured for execution by the one or more processors to receive, from a second network device, an LSP path signaling message that includes a route object having a first indication of at least a sub-path of a path for a traffic engineering label switched path (TE LSP) through a network; and a path computation client configured for execution by the one or more processors to generate, in response to the LSP path signaling message and based at least in part on the route object, an LSP path report message that includes a second indication of the at least the sub-path of the path for the TE LSP and an indication that the first network device is one of an ingress label edge router (LER), a transit label switching router, and an egress LER for the TE LSP, wherein the path computation client is further configured to send, to a path computation element (PCE), the LSP path report message to notify the PCE of the at least the sub-path of the path for the TE LSP.

22. The first network device of claim 21, wherein the LSP path report message comprises a Path Computation Element Protocol (PCEP) Path Computation State Report (PCRpt) message that includes an LSP state report for the TE LSP, and wherein sending the LSP path report message comprises sending, by the first network device via a PCEP session with the PCE, the LSP path report message.

23. The first network device of claim 22, wherein the PCRpt message includes an LSP state report for the TE LSP, and wherein the LSP state report includes at least one flag to indicate that the first network device is one of an ingress LER, a transit label switching router and an egress LER for the TE LSP.

\* \* \* \* \*